W. T. HUDSON.
CANDY MAKING MACHINE.
APPLICATION FILED JUNE 25, 1908.

910,198.

Patented Jan. 19, 1909.

Witnesses
D. E. Wilson
J. J. Sheehy Jr.

Inventor
W. T. Hudson.
By James J. Sheehy
Attorney

W. T. HUDSON.
CANDY MAKING MACHINE.
APPLICATION FILED JUNE 25, 1908.

910,198.

Patented Jan. 19, 1909.

Witnesses
D. E. Wilson
J. J. Sheehy Jr.

Inventor
W. T. Hudson
By James Sheehy
Attorney

W. T. HUDSON.
CANDY MAKING MACHINE.
APPLICATION FILED JUNE 25, 1908.

910,198.

Patented Jan. 19, 1909.
5 SHEETS—SHEET 3.

Witnesses
Inventor
W. T. Hudson
By James J. Sheehy
Attorney

W. T. HUDSON.
CANDY MAKING MACHINE.
APPLICATION FILED JUNE 25, 1908.

910,198.

Patented Jan. 19, 1909.

UNITED STATES PATENT OFFICE.

WILLIAM T. HUDSON, OF ATLANTA, GEORGIA.

CANDY-MAKING MACHINE.

No. 910,198.  Specification of Letters Patent.  Patented Jan. 19, 1909.

Application filed June 25, 1908. Serial No. 440,268.

*To all whom it may concern:*

Be it known that I, WILLIAM T. HUDSON, citizen of the United States, residing at Atlanta, in the county of Fulton and State of Georgia, have invented new and useful Improvements in Candy-Making Machines, of which the following is a specification.

My invention relates to machinery for producing what is commonly known as stick candy; and it has for its general object to provide a reliable and otherwise practical stick-candy machine, possessed of high capacity, and adapted to reduce plastic candy material to a strip of the shape desired in cross-section, divide the said strip into sections or sticks of desired length, and expeditiously and thoroughly cool the sticks so as to render feasible the immediate packing of the same.

With the foregoing in mind, the nature of the invention and its novelty, utility and practical advantages will be fully understood from the following description and claims when the same are read in connection with the drawings, accompanying and forming part of this specification, in which:

Fig. 8ª is a detail plan view of the gearing shown in Fig. 6.

Figure 6:
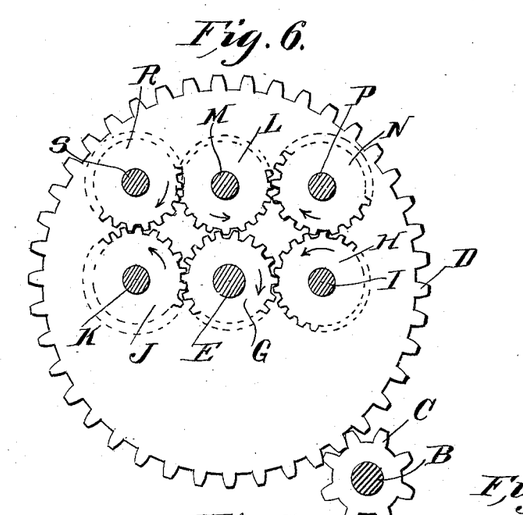
Fig. 6 is a detail view of the gearing of the rollers for feeding and reducing the candy material to the shape desired in cross-section.

Referring by letter and numeral to the drawings: A is the main frame of the machine, which may be of the construction illustrated, or of any other construction consonant with the purpose of my invention, and B is the primary driver or drive-shaft of the machine, from which primary driver or drive shaft the various working parts, hereinafter referred to, derive motion. The primary driver B extends transversely of the main frame adjacent to the forward end thereof, and is provided at one of its ends with a pinion C, intermeshed with a spur gear D on a transversely disposed shaft E, which latter is equipped in addition to the spur gear D with a sprocket wheel F and a spur gear G. As shown best in Fig. 6 the spur gear G is intermeshed with a spur gear H fixed on a transeverse shaft I, with a spur gear J fixed on a transverse shaft K, and with a spur gear L fixed on a transverse shaft M. Intermeshed with the gear H is a gear N on a shaft P, and intermeshed with the gear J is a gear R on a shaft S. The gear L laps the gears N and R; the gear G being made sufficiently thick to enable said gear L to lie in a plane parallel to that of the gears H and J, Figs. 6 and 8ª.

All of the gears G to R are arranged at the inner side of the gear D and at the outer sides of suitable bearings in which bearings T and opposite bearings U are journaled the shafts E, I, K, M, P and S.

Figures 7, 8, 8A:
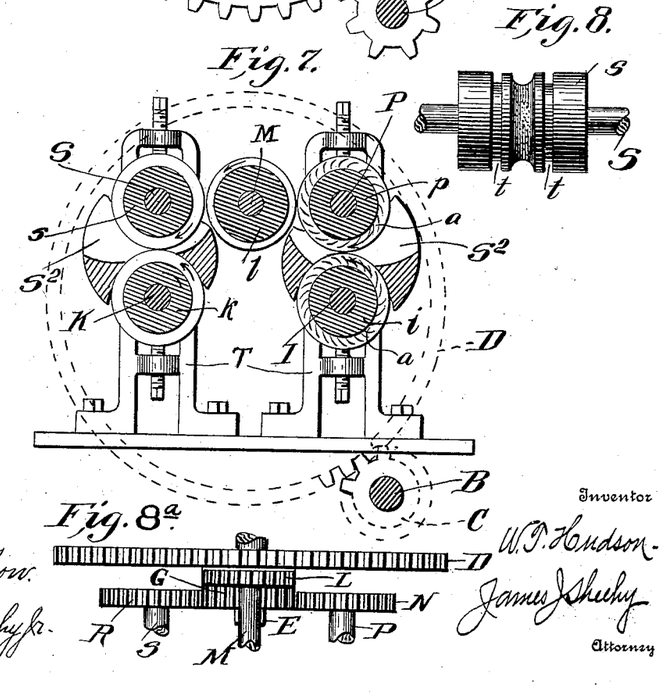
Fig. 7 is a longitudinal, vertical section, taken through said rollers.
Fig. 8 is an elevation of one of the rollers.

At points intermediate the bearings T and U the shafts I, K, M, P and S are provided with circumferentially grooved rollers $i$, $k$, $l$, $p$, and $s$; the rollers $i$ and $p$ being arranged to coöperate with each other, and the roller $s$ being arranged to coöperate with the roller $k$ and also with the roller $l$. Said roller $l$ further coöperates with the roller $p$. The rollers $i$ and $p$ are preferably brass rollers and are roughened, as indicated by $a$, Fig. 7, in order to enable them to positively feed a strip of candy forward between them. From between the rollers $i$ and $p$ the strip of candy passes over the roller $l$ and between said roller $l$ and the roller $s$ and then between said roller $s$ and the roller $k$. The rollers $l$, $s$ and $k$ are designed to feed the strip of plastic candy material rearward or toward the discharge end of the machine, and in order to enable the peripheral portions of said rollers to frictionally engage the plastic strip of candy material without visibly roughening the said strip, I form the said peripheral portions of ground glass, carborundum or equivalent material. Thus it will be manifest that when a strip of plastic candy material is fed by an attendant between the rollers $i$ and $p$, the said rollers $i$ and $p$ will positively move the strip toward the rear or discharge end of the machine, and then incidental to the passage of the strip between the rollers $p$ and $l$ and over said roller $l$ and between the roller $l$ and the roller $s$ and between the roller $s$ and the roller $k$, in the order named, the said rollers $l$, $s$ and $k$ will serve to assist in the positive feed of the strip and in reducing the strip to the shape and size desired in cross-section, and at the same time will obliterate the marks left on the strip by the rough portions $a$ of the rollers $i$ and $p$, and will render the strip smooth and in that way improve the marketable quality of the candy. At this point I desire it understood that while I prefer to employ rollers $i$ and $p$ of brass or other metal, having rough portions, in the feeding of the strip of plastic candy material, I do not desire to be understood as restricting myself to the use of rollers such as $i$ and $p$, since when deemed expedient the feed of the strip of plastic candy material may be effected by two or more coöperating rollers having frictional peripheral portions of ground glass—i. e., glass having a fine, file-like surface, carborundum, or equivalent material. I prefer, as stated, to employ rollers $i$ and $p$, adapted to take a strong hold on the strip of candy material, in combination with the rollers for frictionally engaging the strip and obliterating the marks left by the rollers $i$ and $p$, since such combination is calculated to assure proper feed of the strip and the production of a strip which is not visibly rough. The several rollers $i$, $k$, $p$, $s$ and $l$ turn as indicated by the arrows thereon in Fig. 7. As best shown in Fig. 7, I provide in combination with some or all of the rollers, guides $S^2$, Figs. 1, 7 and 9 which extend into peripheral grooves $t$ in the rollers and bear snug against the perimeters of the rollers at opposite sides of the circumferential channels therein, and serve to prevent the candy strip being caught between the meeting portions of the roller perimeters and provided with fins or lateral projections.

Figure 1:
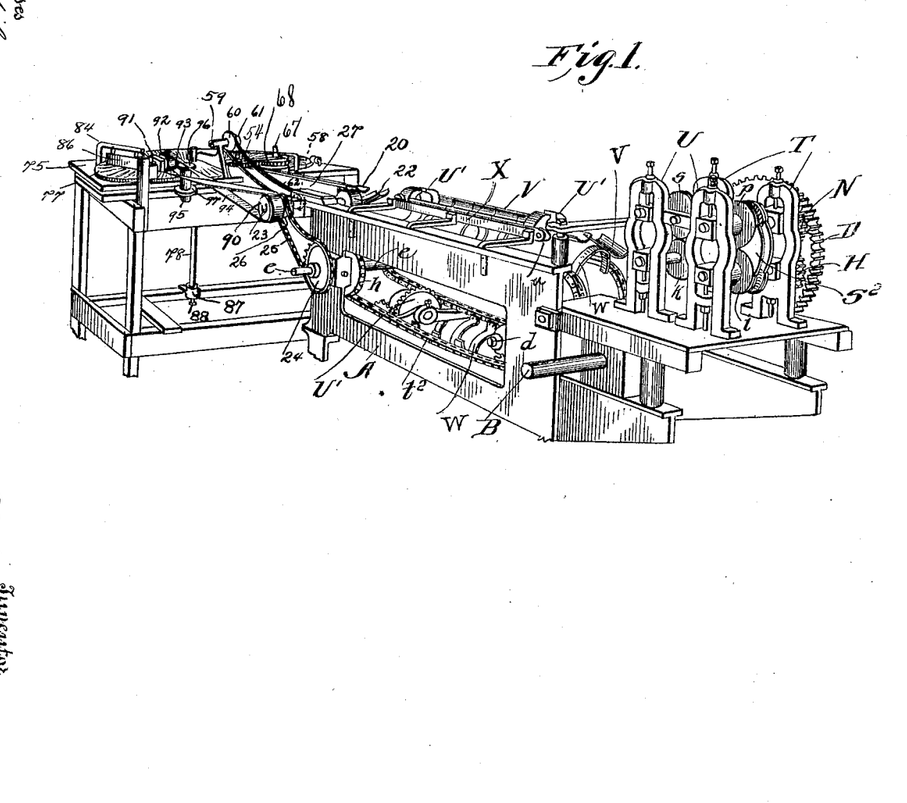
Figure 1 is a perspective view of the machine constituting the best practical embodiment of my invention of which I am aware;
the said view showing the forward end of the machine and all of the parts at one side thereof.
Figure 2:
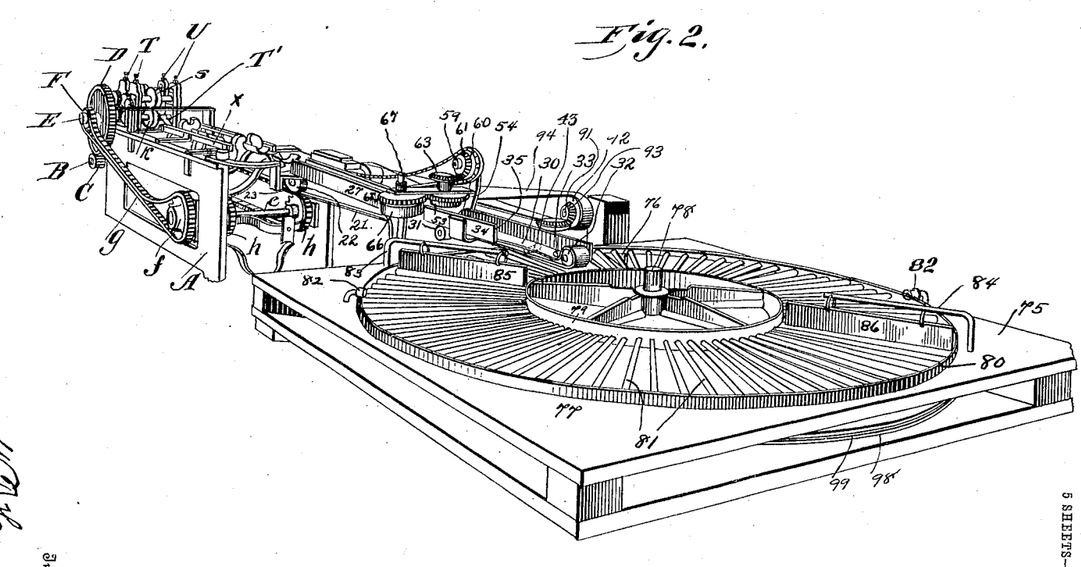
Fig. 2 is a perspective view of the machine illustrative of the rear or cooler end thereof, and also illustrative of the parts at the side opposite to the side referred to in the brief description of Fig. 1.
Figure 3:
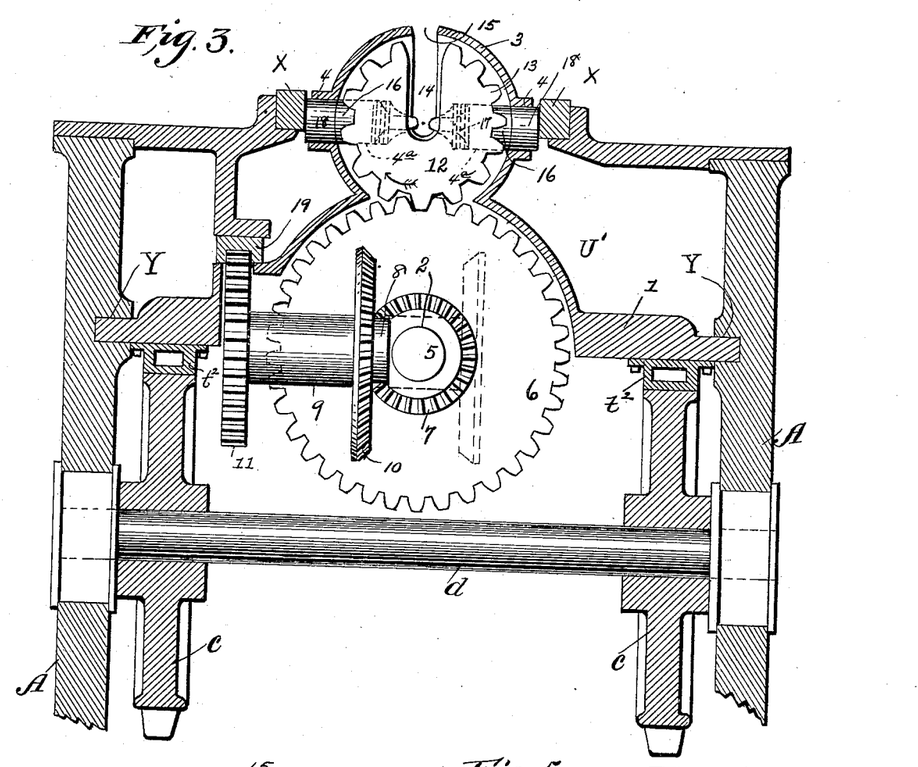
Fig. 3 is an enlarged, detail, transverse section illustrating one of the twisters comprised in my improvements and certain fixed parts that cooperate with the twisters.
Figure 4:
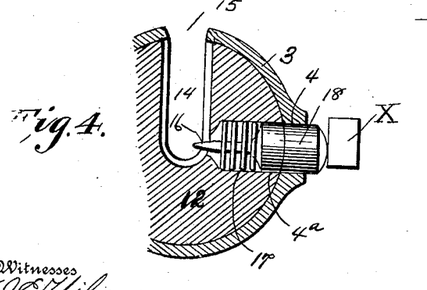
Fig. 4 is an enlarged detail view taken in a plane parallel to that of Fig. 3 and showing the twisting wheel of the twister and certain appurtenances thereof.
Figure 5:
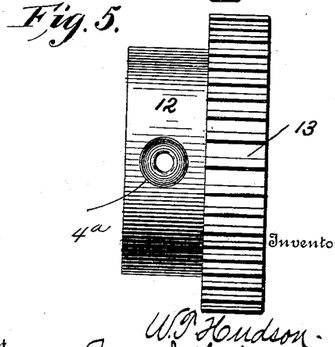
Fig. 5 is an enlarged side elevation of said twisting wheel, removed.

From between the rollers $s$ and $k$ the strip of plastic candy material passes rearwardly through a fixed conduit T', Fig. 2, to the means for twisting and supporting the strip while the same is *en route* to the means for dividing the strip into sections or sticks. The said means for twisting the strip of plastic material comprises the following elements in combination, viz: two idler sprocket wheels $c$ mounted on a transverse shaft $d$ located in the main frame and adjacent to the forward end of the machine, a transverse shaft $e$ journaled in the main frame A and connected through a sprocket wheel $f$ and a sprocket belt $g$, Fig. 2, with the sprocket wheel F on the shaft E, whereby said shaft $e$ derives motion from the shaft E, sprocket wheels $h$ fixed on the shaft $e$, Fig. 1, and alined with the before mentioned idler sprocket wheels $c$ parallel sprocket belts $t^2$ mounted on and engaging the sprocket wheels $c$ and $h$ and designed to be driven by the latter, four (more or less) twisters U' arranged equi-distant, say two feet apart, on the sprocket belts $t^2$, trough sections V arranged intermediate the twisters U and connected through strap-supports W with the belts $t^2$, parallel longitudinal bars X fixed with respect to and spaced apart on the main frame A and having flared forward ends $u$, Fig. 1, and longitudinal guideways Y formed in the inner sides of the side walls of the main frame A. Each of the twisters U' comprises, as best shown in Figs. 3 to 5, a body 1 connected to the belts $t^2$ and adapted to move in the said guideways Y, a bearing 2 fixed with respect to the body 1, a frame or housing 3 also fixed with respect to the body 1 and having opposite guide apertures 4, a shaft 5 journaled in the bearing 2 and carrying a spur gear 6, the body or major portion of which is concavo-convex, and also carrying a miter gear 7, a transversely disposed shaft 8 journaled in a sleeve-bearing 9 fixed with respect to the body 1 and having a miter gear 10 at its inner end and a spur gear 11 at its outer end, a twisting wheel 12 journaled in the upper portion of the frame or housing 3 and having spur-gear teeth 13 intermeshed with the teeth of the gear 6, and also having a longitudinally disposed groove 14 which extends throughout its length and also extends from its perimeter inward to a point beyond its center of movement and is adapted when it coincides with the opening 15 in the top of the frame or housing 3 to receive the strip of plastic candy material, strip grippers 16 movable rectilinearly in the guide apertures $4^a$ of the twisting wheel 12 and adapted as their name implies to take positive hold of the strip of candy material, and coiled springs 17 adapted to press said grippers 16 outwardly, and plungers 18 movable rectilinearly in the guide apertures 4 of the frame or housing 3, and having inner concave ends opposed to the outer convex ends of the grippers 16, Figs. 3 and 4, and also having rounded outer ends adapted to engage the longitudinal bars X. For the sake of compactness the miter gear is arranged at the concave side of the body or major portion of the spur gear 6, and the miter gear 10 extends into said concave side of the spur gear 6 so as to properly mesh with said miter gear 7. The several gears of the twister are rotated only during the upper longitudinal transverse of the twister, and to this end a longitudinal rack bar 19 is fixed with respect to the main frame A. The said longitudinal rack bar 19 is so arranged that the spur gear 11 of the twister will engage with the said rack bar as the twister passes rearwardly from the sprocket gears $h$ on which the belts $t^2$ are mounted, and the spur gear 11 of the twister will pass out of engagement with said rack bar 19 as the twister passes around the idler sprocket gears $c$.

The operation of the twister shown in Figs. 3 to 5 is as follows: During the upper horizontal traverse of the twister—*i. e.*, the traverse from a point adjacent to the forward end of the machine rearwardly, the gears 11, 10, 7, 6 and 12, are rotated because of the gear 11 engaging the fixed longitudinal rack bar 19. Now as the gear 11 passes into engagement with said rack bar 19 the plungers 18 pass between the fixed, longitudinal bars or guides X, with the result that the twisters 16 are pressed, against the action of the springs 17, out of the apertures 4 in the frame or housing 3 and inward in the twisting wheel 12 so as to cause their inner, pointed portions to engage the strip of plastic candy material and securely hold such material incidental to the twisting of the same. While the gear 11 is in mesh with the fixed rack 19, the twisting wheel 12 will obviously be rotated about its axis by the train of gears between the fixed rack bar 19 and said twisting wheel 12, and consequently the strip of candy material will be twisted about its axis. As the gear 11 passes out of engagement with the rack bar 19, the twisting wheel 12 stands with the groove 14 up, thus allowing the twisting wheel 12 and the twister as a whole to pass out of engagement with the strip of candy material. At this time the plungers 18 pass out of engagement with the fixed bars X, whereupon the springs 17 press the strip grippers 16 out into the apertures 4 in the frame or housing 3 and thereby lock the wheel 12 against rotation until the spur gear 11 again engages the rack bar 19 at the commencement of the next upper, rearward traverse of the twister, and the plungers 18 again engage the longitudinal bars X. When the plungers 18 are pressed inward by the bars X in the manner before described, it will be manifest that said plungers will press the strip grippers 16 inward so as to enable said strip grippers to turn with the wheel 12 in the frame 3. The diameter of the strip grippers 16 being greater than the width of the groove or opening 15 in the frame 3 allows the strip grippers 16 to pass said opening 15 without liability of catching therein; and it will also be observed that during rotation of the gear 6 and twisting wheel 12, two teeth of the former mesh in the mouth of the groove 14 of the latter and prevent any slipping of the gears. It will also be understood that when the strip grippers 16 spring out into the apertures 4 of the frame 3, said strip grippers will obviously retain the twisting wheel 12 in the position illustrated, relative to the frame 3, until the spur gear 11 again engages the rack bar 19 at the commencement of the upper, rearward traverse of the twister. Thus with the twister as a whole in the position shown in Fig. 3, the twisting wheel 12 is adapted to receive the strip of plastic candy material from the tube T'.

During the upper, rearward traverse of the twister described in the foregoing, the ends of its body 1 move in and are guided by the before mentioned guideways Y in the main frame A.

As before stated, the twisters on the belts $t^2$ are arranged about two feet apart, and the bars X are of such a length that two of the twisters will be in engagement with the said bars X and the rack bar 19 at one time, as shown in Figs. 1 and 2. I would also have it understood at this point that the twisting wheels 12 of the alternate twisters are rotated in opposite directions—that is to say, the twisting wheel 12 of the twister shown in Figs. 3 to 5 is rotated in the direction indicated by arrow in Fig. 3, and the twisting wheel 12 of the preceding twister is rotated in the opposite direction, this because the miter gear 10 of such preceding twister is arranged as shown in dotted lines in Fig. 3 instead of being arranged as shown in full lines in said figure.

The trough sections V of the twisting mechanism have for their office to form a support for the stretch of candy strip between each pair of the twisters while the latter are making their upper, rearward traverse, and it will be noticed that the said trough sections will effectually prevent sagging of the strip of candy and this in such manner as not to interfere with the means for twisting the strip in one direction and the means for twisting the strip at the same time in the opposite direction.

After the passage of the rearmost of the upper twisters out of engagement with the strip of plastic candy material in the manner before described, the said strip passes to a fixed trough section 20, Fig. 1, and from said fixed trough section 20 the strip passes to a longitudinal conveyer belt 21, Fig. 2. This belt 21 passes around a pulley 22 located below the fixed trough section 20, and the said pulley 22 is fixed on a transverse shaft 23 which is driven from the before mentioned transverse shaft $e$ through a sprocket wheel 24 on shaft $e$, a sprocket belt 25, and a sprocket wheel 26 on said shaft 23. The conveyer belt 21 extends rearwardly from the pulley 22, and its upper stretch is disposed between parallel walls 27, and said belt 21 also passes around and serves to rotate a pulley 28 with which is fixed a spur gear 29. The belt 21 carries the strip of plastic candy material to the means, presently described, for dividing the strip into sections or sticks of the desired length, and for the purpose of speedily conveying each section or stick rearwardly immediately subsequent to the separation thereof from the strip, I provide a comparatively fast moving conveying means which is preferably in the form of a longitudinal belt numbered 30. This belt numbered 30 passes around a forward roller 31 and a rear, idler roller 32, and is also carried over and under comparatively small idler rollers 33 arranged adjacent to the rollers 31 and 32. I also prefer to arrange the upper stretch of the belt 30 above the bottom wall of a trough 34 having in one of its side walls a lateral opening 35 to permit of the sidewise discharge of the sections or sticks of candy. From the conveyer belt 21 the strip of plastic candy material passes over a suitable plate or other bridge 40 to the speed belt 30, and when a proper length of the strip is on the belt 30 the stick or section is cut, in the manner hereinafter described, from the strip, whereupon the belt 30 which is moved faster than the belt 21 will speedily move the stick rearwardly from the advancing strip. This will be appreciated as a very important advantage when it is borne in mind that if the strip of plastic candy material traveled as fast as the severed stick, the opposed ends of the strip and stick would be cemented together in rear of the dividing or cutting means, it being also taken into consideration in this connection that at the time stated the candy material is in a heated state. For the purpose of driving the belt 30 faster than the belt 21 I provide on the roller 31 a spur gear 41 that is considerably smaller than the spur gear 29 on the roller 28 complementary to the belt 21, and I also provide a spur gear 42 which is arranged between and intermeshed with the spur gear 29 and the comparatively small spur gear 41.

With a view of laterally inclining the upper stretch of the belt 30 downward toward the opening 35 in the trough 34, I provide the cone shaped supporting roller 43 which is arranged transversely under the upper stretch of the belt 30 with its small end toward the said opening 35. Thus it will be manifest that each stick or section of candy will, when it reaches a position opposite the opening 35, roll down the transversely inclined upper stretch of the belt and through the said opening 35.

For the purpose of severing or dividing sections or sticks of the desired length from the continuously advancing strip of candy material, I provide the cutting mechanism best shown in Figs. 1, 2, 9, and 10. The said mechanism comprises a transverse bar 50 fixed with respect to the main frame A and carrying the before mentioned bridge or bridge-plate 40, a cam 51 fixed on the said bar 50 and having an abrupt shoulder 52, a body 53 of the shape shown or circular surrounding and rotatable about the cam 51 and fixed with respect to a spur gear 54, three (more or less), equi-distant plungers 55 movable radially in the body 53 and having inner ends fitted or adapted to engage the fixed cam 51 and also having outer ends or knives 56 adapted to transversely penetrate the strip of plastic candy material, and coiled springs 57 of which there is one complementary to each plunger 55; the said coiled springs having for their office to retract the plungers 55 so that the forward ends of the knives 56 normally rest either flush with or slightly within the perimeter of the body 53. The said rotatable body 53 and the spur gear 54 are rotatable from the transverse shaft 23 through the medium of the sprocket gear 58 on said shaft 23, a horizontal shaft 59, Fig. 1, journaled in a suitable bearing on the main frame and carrying a sprocket gear 60 and a miter gear 61, a sprocket belt 62 connecting the sprocket gears 58 and 60, and a miter gear 63 fixed on the same shaft as or otherwise fixed with respect to the gear 54 and the rotatable body 53 and intermeshed with the miter gear 61. Incidental to the rotation of the body 53 about the fixed cam 51 in the direction indicated by arrow, the plungers 55 are each forced radially outward as each approaches a position at a right angle to the line of movement of the strip of candy material with its knife 56 adjacent to said strip of material, and then when each plunger has slightly passed said position and the abrupt shoulder 52 of the fixed cam 51 the spring 57 will quickly move the plunger inward and sheath the knife 56 thereof in the body 53 and in that way will effectually prevent the knife catching into or otherwise interfering with the longitudinal movement of the strip of candy material. The dividing or cutting mechanism also comprises a journal 64 fixed on the transverse bar 50 and having a radially disposed and beveled, spring-backed pin 65, a rotatable body 66 circular or of the shape shown, surrounding the fixed journal 64 and mounted on a shaft 67 rising from the said fixed journal 64, a spur gear 68 intermeshed with and arranged to derive motion from the spur gear 54 and fixed with respect to the rotatable body 66 so as to rotate said body, three (more or less) radially disposed knives carried by the rotatable body 66, and springs 70 for retracting the said knives so that the edges thereof normally lie flush with or slightly within the perimeter of the rotatable body 66. The rotatable body 66 has a circular portion 71 into which extend the inner ends of the knives 69, and said circular portion 71 surrounds the fixed journal 64 and is provided, at points intermediate the inner ends of the knives 69 with cams 72, arranged in a circular series. Thus it will be manifest that when the spring-backed pin 65 in the fixed journal 64 is disposed at a right angle to and directed toward the path of the strip of candy material, and the body 66 is rotated about the fixed journal 64, the cam 72 that precedes each knife 69 will, as the mentioned knife approaches a position toward and at right angles to the strip of candy material, force the spring-pressed pin 65 inward, and then when the large end of the cam clears the said pin 65, the said pin will be impelled outward and striking against the inner end of the mentioned knife 69 will force said knife outward and through the strip of candy material until the knife edge reaches a point adjacent to the opposite knife 56 of the rotatable body 53, which knife 56 is at that time disposed in the strip of candy material, after the manner before described. Immediately subsequent to the said outward movement of the mentioned knife 69 the coiled spring 70 complementary thereto will retract the knife so as to sheath the edge thereof in the rotatable body 66 and preclude the knife retarding or otherwise interfering with the advancing strip of candy material.

It will be understood from the foregoing that each knife 56 of the rotatable body 53 coöperates in the manner described with a respective or complementary knife 69 of the rotatable body 66, and consequently incidental to the movement of the strip of candy material toward the rear or discharge end of the machine, sticks or sections will be divided from the strip at a point above the before mentioned bridge or bridge-plate 40, and immediately subsequent to the disconnection of each stick or section from the strip, the said stick or section will be carried rapidly away from the strip by the fast moving belt 30 in the manner and for the purpose before set forth in detail. The sleeve between the spur gear 54 and the miter gear 63 is journaled in a transverse frame bar 73, and the shaft or fixed post 67 extends through the said frame bar, as shown.

When the sticks or sections of candy are discharged one by one and laterally through the opening 35 in the wall of the trough 34, the said sticks or sections are received in the cooler of the machine. The said cooler comprises a slab or plate 75, disposed horizontally and formed of marble or any other suitable material and having an opening 76 disposed back of the opening 35 in the trough 34, with reference to the direction in which the wheel 77 rotates, the said wheel 77 which is fixed on a vertical shaft 78 and has an inner portion 79, an outer portion or rim 80, and rods 81, preferably of circular form in cross-section, spaced apart and extending between and connected to the portion 79 and the rim 80, suitably supported, opposite, anti-friction rollers 82 which bear on the rim of the wheel 77 and serve to hold the said wheel down adjacent to the upper surface of the plate 75, an arm 83 which overhangs the wheel 75 at a point slightly in front of the discharge opening 35 of the trough 34, an overhanging arm 84 which is disposed about opposite to the arm 83, and pendent plates 85 and 86 hung from the arms 83 and 84, respectively, and having for their function to sweep off any sticks of candy that may lodge on the rods 81 and compel the said sticks to assume positions on the plate or slab 75 and between the rods 81; the pendent plate 86 serving to dislodge from the rods 81 any sticks that may get past the plate 85 without being dislodged. As before stated the horizontally disposed wheel 77 is fixed on a vertical shaft 78, and said shaft 78 is stepped in a suitable bearing 87, Fig. 1, and rests on a screw 88 through the medium of which latter the shaft and the wheel 77 thereon may be properly adjusted and adjustably fixed, relative to the plate 75. Rotary motion is transmitted to the shaft 78, and the wheel 77 is slowly rotated in the direction indicated by arrow in Fig. 2 by the pulley 90 on shaft 23, a horizontal shaft 91 provided with a pulley 92 and a miter gear 93, a belt 94 connecting the pulleys 90 and 92, a vertical shaft 95 carrying a miter gear 96 which is intermeshed with the miter gear 93, and also carrying a circumferentially grooved pulley 97, a comparatively large and circumferentially grooved pulley 98 fixed on the shaft 78 at a point below the plate 75, and a belt 99 connecting the pulley 97 and the pulley 98, on shaft 78. Thus it will be understood that when the machine is in operation and the wheel 77 is slowly turned in the direction indicated by arrow each stick of candy discharged from the belt 30 in trough 34 will drop into a space between two rods 81 of the wheel 77, and as said wheel turns, the stick of candy will be rolled on the plate 75, and in that way the cooling of the stick will be accelerated without affecting the shape in cross-section of the stick. The said rolling of the stick of candy on the plate 75 will continue until the stick reaches a position above the opening 76 when it will drop through said opening.

Figure 9:
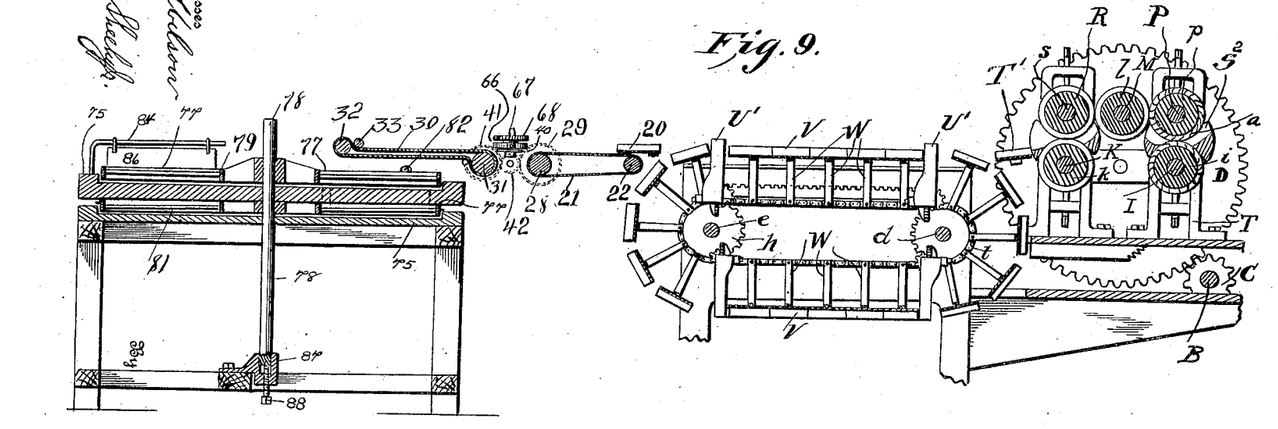
Fig. 9 is a longitudinal, vertical section, taken through the machine as a whole.
Figures 10, 11:
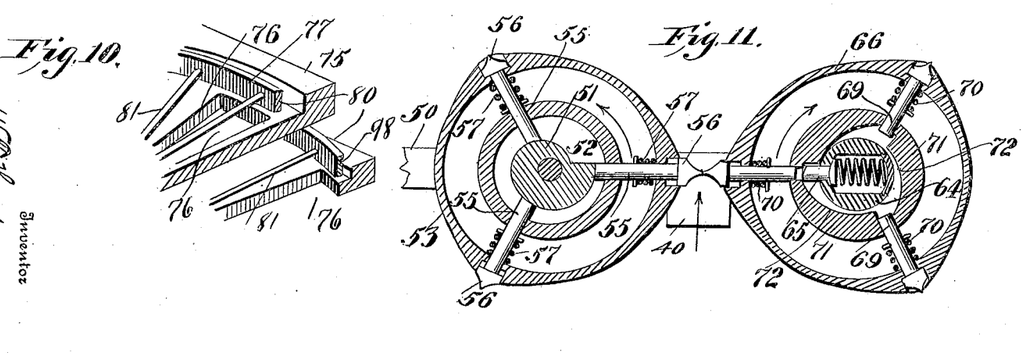
Fig. 10 is a detail view of a part of the cooler shown in Fig. 9.
Fig. 11 is an enlarged horizontal section of the cutting mechanism.

I prefer to employ several wheels 77 and plates 75 complementary to the wheels, and therefore in Fig. 9 have shown two wheels 77 and two plates 75; the lower plate 75 being provided at a point immediately in rear of the opening 76 of the upper plate 75, with reference to the direction in which the wheels 77 turn, with a similar discharge opening 76, this arrangement being resorted to in order that when the sticks drop through the opening 76 of the upper plate 75, the said sticks will be carried through almost a complete circle on the lower plate 75 before they are discharged through the said discharge opening 76 of the lower plate. The lower wheel 77 is preferably arranged close to the under side of the upper plate 75, and hence it is unnecessary to employ devices like the plates 85 and 86 in combination with the said lower wheel. When deemed expedient any suitable means may be employed for maintaining the plates 75 in a cool state, but such means forms no part of my present invention, and I have therefore deemed it unnecessary to illustrate the same.

It will be gathered from the foregoing that when the candy sticks are discharged from the last plate or slab 75 of the series of plates and wheels employed, the said sticks will be sufficiently cooled to permit of the immediate packing thereof.

I have herein illustrated and described the best practical embodiment of my invention of which I am cognizant, but it is obvious that in the future practice of the invention various changes in the form, construction and relative arrangement of the parts may be made within the scope of my invention as defined in the claims appended.

Having described my invention, what I claim and desire to secure by Letters-Patent, is:

1. In a machine for making candy, the combination of means for moving a strip of candy material and twisting the strip incidental to said movement thereof, means for separating a section from said strip, and means for moving the separated section in the same direction as the strip is moved and at a greater speed than said strip.

2. In a machine for making candy, the combination of means for moving a strip of candy material, means for twisting the strip in one direction incidental to said movement, means for twisting the strip in the opposite direction incidental to said movement, means for separating a section from the twisted strip, and means for moving the separated section faster than the strip away from the strip.

3. In a machine for making candy, the combination of means for moving a strip of candy material, means for twisting the strip in one direction incidental to said movement, means for twisting the strip in the opposite direction incidental to said movement, means for separating a section from said strip, and means for moving the separated section in the same direction that the strip is moved and at a greater speed than said strip.

4. In a machine for making candy, the combination of means for moving a strip of candy material, means for separating a section from said strip, means for moving the separated section in the same direction that the strip is moved and at a greater speed than said strip, means for laterally discharging the separated section from the means by which it is moved at a greater speed than the strip, and means for moving the section laterally over a surface to cool the said section.

5. In a machine for making candy, the combination of means for moving a strip of candy material and twisting the strip incidental to said movement thereof, means for separating a section from the twisted strip, means for moving the separated section in the same direction that the strip is moved and at a greater speed than said strip, means for laterally discharging the separated section from the means by which it is moved at a greater speed than the strip, and means for laterally rolling the section over a surface to cool said section.

6. In a machine for making candy, the combination of means for moving a strip of candy material, means for separating a section from said strip, means for moving the separated section in the same direction that the strip is moved and at a greater speed than said strip, means for laterally discharging the separated section from the means by which it is moved at a greater speed than the strip, a plate having a discharge opening, and a wheel movable above said plate and opening therein and having radial rods and also having spaces between the rods for receiving sections of candy from the said laterally discharging means.

7. In a machine for making candy, the combination of means for moving a strip of candy material, means for twisting the strip in one direction incidental to said movement, means for twisting the strip in the opposite direction incidental to said movement, means for separating a section from said strip, means for moving the separated section in the same direction that the strip is moved and at a greater speed than said strip, means for laterally discharging the separated section from the means by which it is moved at a greater speed than the strip, and means for laterally rolling the section over a surface to cool said section.

8. In a machine for making candy, the combination of means for moving a strip of candy material, means for twisting the candy in one direction incidental to said movement thereof, means for twisting the candy in the opposite direction incidental to said movement thereof, means for separating a section from the twisted strip of candy, means for moving the separated section in the same direction that the strip is moved and at a greater speed than said strip, means for laterally discharging the separated section from the means by which it is moved at a greater speed than the strip, a plate having a discharge opening, and a wheel movable above said plate and opening therein and having radial rods and also having spaces between the rods for receiving sections of candy from the said laterally discharging means.

9. In a machine for making candy, the combination with means for moving a strip of candy material and for moving sticks or sections separated from said strip, of means located at one side of the path of the strip and comprising a rotary body, plungers carried by and movable with respect to said body and adapted to transversely penetrate the strip, and means for forcing said plungers outwardly incidental to rotation of the body, and means adapted to coöperate with said means to separate sticks or sections from the strip, located at the opposite side of the path of the strip.

10. In a machine for making candy, the combination of means for moving a strip of candy material, means for separating a section from the said strip, a trough having a discharge opening in one of its side walls, a belt movable in said trough for moving the separated section in the same direction that the strip is moved and at a greater speed than said strip, and means for laterally inclining the stretch of the belt on which the separated section is carried, at a point opposite the discharge opening of the trough.

11. In a machine for making candy, the combination of means for moving a strip of candy material, means for separating a section from the said strip, a trough having a discharge opening in one of its side walls, a belt movable in said trough for moving the separated section in the same direction that the strip is moved, and means for laterally inclining the upper stretch of the belt at a point opposite the discharge opening of the trough.

12. In a machine for making candy, the combination of a trough having a discharge opening in one of its side walls, a suitably supported and driven belt movable in said trough, and a tapered roller arranged transversely under the upper stretch of the belt to incline said stretch downward toward said opening.

13. In a machine for making candy, the combination of a plate having a discharge opening, and a wheel movable above the plate and opening therein and having radial rods and also having spaces between the rods adapted to receive sections of candy.

14. In a machine for making candy, combination of a plate having a discharge opening, a wheel movable above the plate and opening therein and having radial rods and also having spaces between the rods adapted to receive sections of candy, means for discharging sections of candy to the spaces between the rods of the wheel, and means for displacing any sections of candy that may lodge on the rods intermediate the spaces of the wheel.

15. In a machine for making candy, the combination of endless carrying means, twisters arranged on said carrying means at intervals in the length thereof, means for moving the carrying means, means for actuating the twisters incidental to such movement of the carrying means, and candy supporting sections connected with the carrying means and arranged intermediate the twisters.

16. In a machine for making candy, the combination of suitably supported endless belts, means for moving said belts, twisters arranged on the belts at intervals in the length thereof, means for actuating the twisters incidental to movement of the belts, candy supporting sections arranged intermediate the twisters, and connections intermediate of each of said sections and the belts.

17. In a machine for making candy, the combination with roughened feed-rollers, of rollers adapted to coöperate with each other and with the roughened feed-rollers and having surfaces of carborundum for frictionally engaging the candy material without roughening the same and for obliterating the roughness left by the first named rollers.

18. In a machine for making candy, the combination with feed-rollers having roughened meeting surfaces for giving the shape desired in cross-section to the candy material and for positively engaging the candy material, of rollers adapted to coöperate with each other and with the roughened feed-rollers and having meeting surfaces of carborundum for giving the shape desired in cross-section to the candy material and for frictionally engaging the candy material without roughening the same and for obliterating the roughness left by the first named rollers.

19. In a machine for making candy, the combination with rollers having their perimeters opposed to each other and also having grooves in said perimeters for receiving candy material, and grooves in the perimeters at opposite sides of the first named grooves, of guides which extend between the rollers and into the second named grooves thereof for the purpose set forth.

20. In a machine for making candy, the combination with rollers having their perimeters opposed to each other and also having roughened grooves in said perimeters for receiving candy material and grooves in the perimeters at opposite sides of the first named grooves, and rollers adapted to coöperate with each other and with the first named rollers and having grooves in their perimeters for frictionally engaging the candy material without roughening the same and for obliterating the roughness left by the first named rollers and also having grooves in their perimeters at opposite sides of the first named grooves therein, of guides which extend between the rollers and into the outer grooves thereof for the purpose set forth.

21. In a machine for making candy, coöperating rollers having surfaces of carborundum for frictionally engaging the candy material without roughening the same.

22. In a machine for making candy, coöperating rollers having meeting surfaces for giving the shape desired in cross-section to the candy material; the said surfaces being of carborundum for frictionally engaging the candy material without roughening the same.

23. In a machine for making candy, the combination of a twister comprising a rotary, candy-twisting device adapted to receive the candy, and means in said rotary device movable with respect thereto into and out of engagement with the candy, means for moving the twister, means for rotating the rotary device incidental to a traverse of the twister, means for putting the first mentioned means in engagement with the candy at the commencement of said traverse, and means for disengaging the first mentioned means from the candy at the completion of said traverse.

24. In a machine for making candy, the combination of a twister comprising a frame having an opening for the passage of a strip of candy, a rotary, candy-twisting device having a groove adapted to register with said opening in the frame and receive the strip of candy, means in said rotary device movable into and out of engagement with the frame and the strip of candy, means for moving the twister, means for rotating the rotary device incidental to a traverse of the twister, means for putting the first mentioned means out of engagement with the frame and in engagement with the strip at the commencement of said traverse, and means for putting said first mentioned means out of engagement with the strip of candy and in engagement with the frame at the completion of said traverse.

25. In a machine for making candy, the combination of a twister comprising a frame having an opening for the passage of a strip of candy, a rotary, candy-twisting device having a groove adapted to register with said opening in the frame and receive the strip of candy, a strip-gripper movable in the rotary candy-twisting device and into and out of engagement with the frame, a plunger in the frame for coöperating with the strip-gripper, means for rotating the rotary device incidental to a traverse of the twister, means for moving the plunger inward at the commencement of the traverse and holding said plunger against outward movement during the traverse, and a spring for moving the strip-gripper and the plunger outwardly at the completion of the traverse.

26. In a machine for making candy, the combination of a main frame having guideways in the inner sides of its side walls, parallel belts suitably supported in the frame, means for driving said belts, a longitudinal bar fixed with respect to the main frame, and twisters carried by the belts at intervals in the length thereof and respectively comprising a body movable in the guideways of the main frame, a frame fixed to the body and having an opening for the passage of a strip of candy, a rotary, candy-twisting device having a groove adapted to register with said opening in the frame and receive the strip of candy, a strip-gripper movable in the rotary candy-twisting device and into and out of engagement with the frame, a plunger in the frame adapted to be engaged by the said longitudinal bar on the main frame and also adapted to coöperate with the strip-gripper, means for moving the strip-gripper and the plunger outward when the latter passes out of engagement with said bar, and means for rotating the candy-twisting device while the plunger is in engagement with said bar.

27. In a machine for making candy, the combination of a main frame, an endless carrier mounted in said frame, means for moving said carrier, candy-twisters arranged on the carrier at intervals in the length thereof, means for actuating the twisters incidental to movement thereof with the carrier, and candy-supporting sections arranged intermediate the twisters and connected and movable with the carrier.

28. In a machine for making candy, the combination of a main frame having guideways in the inner sides of its side walls, parallel belts suitably supported in the frame, means for driving said belts, a longitudinal bar fixed with respect to the main frame, a longitudinal rack also fixed with respect to the main frame, twisters carried by the belts at intervals in the length thereof and respectively comprising a body movable in the guideways of the main frame, a frame fixed to the body and having an opening for the passage of a strip of candy, a rotary, candy-twisting device having a groove adapted to register with said opening in the frame and receive the strip of candy, a gear mounted in the frame and connected with the candy-twisting device and adapted on one traverse of the twister to engage and be rotated by the fixed rack, a strip-gripper movable in the rotary candy-twisting device and into and out of engagement with the frame, a plunger in the frame adapted to be engaged by the said longitudinal bar on the main frame and also adapted to coöperate with the strip-gripper, and means for moving the strip-gripper and the plunger outward when the latter passes out of engagement with said bar, candy-supporting sections arranged intermediate the twisters and each connected with the belts, a stationary candy-supporting section at one end of the said traverse of the twisters, and means for giving shape in cross-section to and feeding a strip of candy material at the opposite end of the said traverse of the twisters.

29. In a machine for making candy, the combination of a movable twister having a rotary candy-twisting device adapted to receive the candy and also having means movable in and with respect to said rotary device and adapted to be put into engagement with and disengaged from the candy to be twisted, means for moving the twister as a whole, means for rotating the rotary twisting device as the twister is moved, means for putting the said first mentioned means into engagement with the candy to be twisted, and means for disengaging said first mentioned means from the candy.

30. In a machine for making candy, the combination of a movable twister having a rotary candy-twisting device adapted to receive the candy and also having means in said device for positively engaging the candy to be twisted, which means is automatically moved with respect to the rotary candy-twisting device and into and out of engagement with the candy incidental to movement of the twister, means for moving the twister, and means for rotating the candy-twisting device incidental to said movement of the twister.

31. In a machine for making candy, the combination with means for moving a strip of candy material and for moving sticks or sections separated from said strip, of means located at one side of the path of the said strip, and comprising a rotary body, plungers carried by and movable with respect to said body and adapted to transversely penetrate the strip of candy material, and means for forcing said plungers outward incidental to rotation of the body, and means located at the opposite side of the path of the said strip and comprising a rotary body, plungers carried by and movable with respect to said body and adapted to transversely penetrate the strip each in opposition to one of the first named plungers, means in the second named body for retracting the plungers carried thereby, and means for impelling said plungers outward at the proper times, and means for rotating the rotary bodies at opposite sides of the path of the strip.

In testimony whereof I have hereunto set my hand in presence of two subscribing witnesses.

WILLIAM T. HUDSON.

Witnesses:
J J. Sheehy, Jr.,
Thomas E. Turpin.